US009559896B2

(12) United States Patent
Patwardhan et al.

(10) Patent No.: US 9,559,896 B2
(45) Date of Patent: Jan. 31, 2017

(54) NETWORK-ASSISTED CONFIGURATION AND PROGRAMMING OF GATEWAYS IN A NETWORK ENVIRONMENT

(71) Applicant: CISCO TECHNOLOGY, INC., San Jose, CA (US)

(72) Inventors: Sourabh Suresh Patwardhan, Santa Clara, CA (US); Maithili Narasimha, Sunnyvale, CA (US); Shankar Ramachandran, Sunnyvale, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 761 days.

(21) Appl. No.: 13/936,966

(22) Filed: Jul. 8, 2013

(65) Prior Publication Data
US 2015/0012621 A1    Jan. 8, 2015

(51) Int. Cl.
*G06F 15/173* (2006.01)
*H04L 12/863* (2013.01)
*H04L 12/24* (2006.01)
*H04L 12/741* (2013.01)

(52) U.S. Cl.
CPC ................ *H04L 41/0803* (2013.01)

(58) Field of Classification Search
CPC .................................... H04L 41/0803
USPC ........................................ 709/220
See application file for complete search history.

(56) References Cited

U.S. PATENT DOCUMENTS

| 6,877,036 B1* | 4/2005 | Smith ..................... H04L 69/16 709/202 |
| 8,351,898 B2* | 1/2013 | Raleigh ................... H04L 12/14 370/328 |
| 8,566,847 B2* | 10/2013 | Ling ......................... G06F 9/54 709/203 |
| 9,154,433 B2* | 10/2015 | Koponen ............ G06F 9/45558 |
| 2004/0268086 A1* | 12/2004 | Masuyama ........... G06F 9/4443 712/1 |
| 2006/0187928 A1* | 8/2006 | McGee ................ H04L 41/082 370/390 |

(Continued)

OTHER PUBLICATIONS

Cisco, "One Platform Kit (OnePK) for Developers" At-A-Glance, Jun. 2013, 1 page; http://www.cisco.com/en/US/prod/collateral/iosswrel/content/at_a_glance_c45-708540.pdf.

(Continued)

*Primary Examiner* — Kevin Bates
*Assistant Examiner* — Golam Mahmud
(74) *Attorney, Agent, or Firm* — Patent Capital Group (57) ABSTRACT

An example method for network-assisted configuration and programming of gateways in a network environment is provided and includes registering a non-Virtual eXtensible Local Area Network (VXLAN) device with a central controller, for example, by generating registration information associating the non-VXLAN device with a virtual local area network (VLAN) in a network environment, receiving a communication request from a VXLAN enabled device to communicate with the non-VXLAN device, mapping, based on the registration information, a VXLAN segment corresponding to the VXLAN enabled device with the VLAN associated with the non-VXLAN device, and configuring a gateway with the mapping through a suitable application programming interface exposed at the gateway.

20 Claims, 3 Drawing Sheets

(56) References Cited

U.S. PATENT DOCUMENTS

| | | | |
|---|---|---|---|
| 2007/0110077 A1* | 5/2007 | Takashige | H04L 12/4675 370/395.53 |
| 2008/0052384 A1* | 2/2008 | Marl | H04L 12/2807 709/223 |
| 2011/0145279 A1* | 6/2011 | Chunilal | G06F 17/30867 707/769 |
| 2011/0307889 A1* | 12/2011 | Moriki | G06F 9/45558 718/1 |
| 2013/0111355 A1* | 5/2013 | Jennings | H04L 12/1822 715/753 |
| 2013/0170490 A1* | 7/2013 | Kreeger | H04L 41/12 370/390 |
| 2013/0185426 A1* | 7/2013 | Chevillat | G06Q 50/01 709/225 |
| 2014/0032531 A1* | 1/2014 | Ravi | G06F 17/30554 707/722 |
| 2014/0071983 A1* | 3/2014 | Banavalikar | H04L 45/72 370/389 |
| 2014/0092907 A1* | 4/2014 | Sridhar | H04L 45/74 370/392 |
| 2014/0123211 A1* | 5/2014 | Wanser | H04L 63/10 726/1 |
| 2014/0173018 A1* | 6/2014 | Westphal | H04L 41/0823 709/213 |
| 2014/0204803 A1* | 7/2014 | Nguyen | H04L 41/5054 370/255 |
| 2014/0280457 A1* | 9/2014 | Anton | G06Q 40/08 709/202 |
| 2014/0280817 A1* | 9/2014 | Uppalapati | H04L 41/044 709/223 |
| 2014/0280997 A1* | 9/2014 | Dutta | H04L 69/03 709/230 |
| 2015/0023210 A1* | 1/2015 | Kis | H04L 45/563 370/254 |

OTHER PUBLICATIONS

Brocade Communications Systems, Inc., "Technology Solution, Software Defined Networking (SDN) with VMware's VXLAN and the Brocade ADX Application Delivery Solution/" © 2012, 2 pages; http://www.brocade.com/downloads/documents/solution_briefs/partners_solution_briefs/brocade-vmware-vxlan-sb.pdf.

Martinussen, "Introduction to Software Defined Networks (SDN) and its relevance in the DC," Cisco Connect Belgium & Luxembourg, Apr. 18, 2013, 43 pages; http://www.cisco.com/web/europe/ciscoconnect2013/pdf/DC_3_SDN.pdf.

Mahalingam, et al., "VXLAN: A Framework for Overlaying Virtualized Layer 2 Networks over Layer 3 Networks," Network Working Group, Internet Draft, Aug. 26, 2011, 20 pages; http://tools.ietf.org/html/draft-mahalingam-dutt-dcops-vxlan-00.

Sridharan, et al., "NVGRE: Network Virtualization using Generic Routing Encapsulation," Internet Draft, Sep. 2011, 18 pages; http://tools.ietf.org/html/draft-sridharan-virtualization-nvgre-00.

VMWare, Inc., "VMware VXLAN: Solving the Datacenter Network Challenge," © 2013, 2 pages; http://www.vmware.com/solutions/datacenter/vxlan.html.

Cisco, "Scalable Cloud Networking with Cisco Nexus 1000V Series Switches and VXLAN," White Paper, © 2012, 6 pages; http://www.cisco.com/en/US/prod/collateral/switches/ps9441/ps9902/white_paper_c11-685115.pdf.

* cited by examiner

NETWORK-ASSISTED CONFIGURATION AND PROGRAMMING OF GATEWAYS IN A NETWORK ENVIRONMENT

TECHNICAL FIELD

This disclosure relates in general to the field of communications and, more particularly, to network-assisted configuration and programming of gateways in a network environment.

BACKGROUND

Data centers are increasingly used by enterprises for collaboration and for storing data and/or resources. A typical data center network contains myriad network elements, including hosts, loadbalancers, routers, switches, etc. The network connecting the network elements provides secure user access to data center services and an infrastructure for deployment, interconnection, and aggregation of shared resource as required, including applications, hosts, appliances, and storage. Improving operational efficiency and optimizing utilization of resources in data centers are some of the challenges facing data center managers. Data center managers want a resilient infrastructure that consistently supports diverse applications and services and protects the applications and services against disruptions. A properly planned and operating data center network provides application and data integrity and optimizes application availability and performance.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method for network-assisted configuration and programming of gateways in a network environment is provided and includes registering a non-Virtual eXtensible Local Area Network (VXLAN) device with a central controller, for example, by generating registration information associating the non-VXLAN device with a virtual local area network (VLAN) in a network environment, receiving a communication request from a VXLAN enabled device to communicate with the non-VXLAN device, mapping, based on the registration information, a VXLAN segment corresponding to the VXLAN enabled device with the VLAN associated with the non-VXLAN device, and configuring a gateway with the mapping through a suitable application programming interface exposed at the gateway.

Example Embodiments

Figure 1:
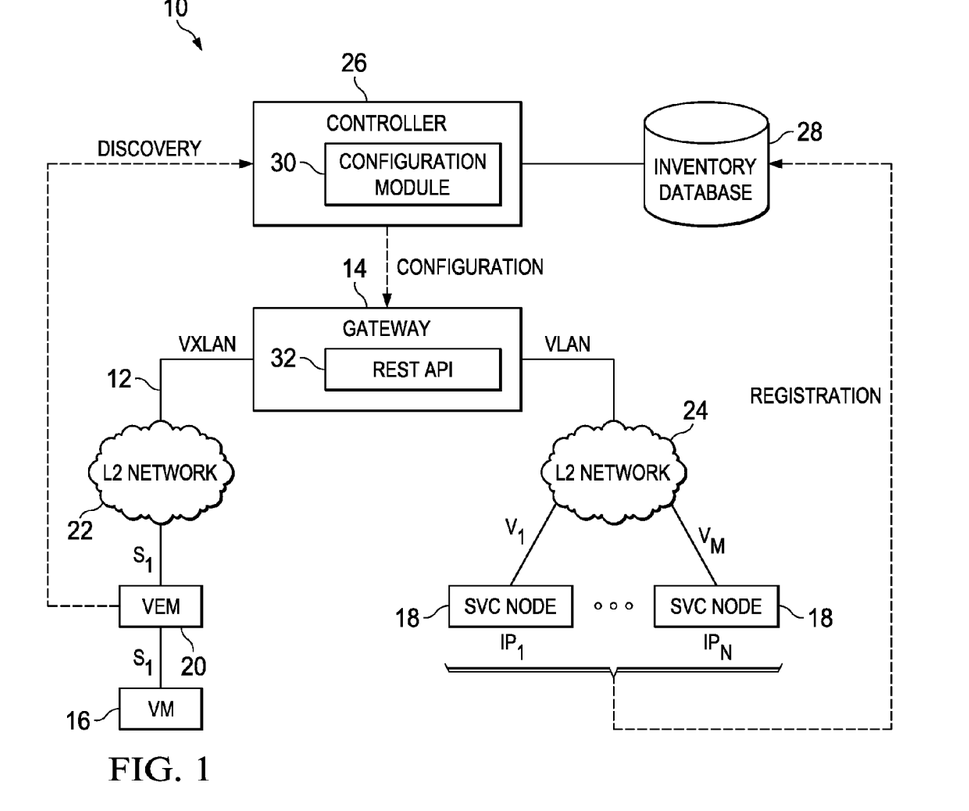
FIG. 1 is a simplified block diagram illustrating a communication system to facilitate network-assisted configuration and programming of gateways in a network environment according to an example embodiment.

Turning to FIG. 1, FIG. 1 is a simplified block diagram illustrating an embodiment of communication system 10 for facilitating network-assisted configuration and programming of gateways in a network environment. Communication system 10 includes a network 12 comprising devices enabled with virtual eXtensible Local Area Network (VXLAN) that communicate with non-VXLAN devices (e.g., devices that are not enabled with VXLAN) through a gateway 14. As used herein, the term "gateway" encompasses a network element that can forward traffic between VXLAN and non-VXLAN environments. A network element encompasses computers, network appliances, servers, routers, switches, gateways, bridges, load-balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. In various embodiments, gateway 14 can include software or hardware with numerous interfaces to enable forwarding traffic between VXLAN enabled devices and non-VXLAN devices in network 12. In a general sense, the gateway (e.g., gateway 14) facilitates the extension of a Layer 2 network over a Layer 3 network.

VXLAN refers to an encapsulation protocol for running an overlay network on existing Layer 3 infrastructure. The term VXLAN as used herein includes the protocol according to Internet-Draft titled "VXLAN: A Framework for Overlaying Virtualized Layer 2 Networks over Layer 3 Networks" submitted with the Internet Engineering Task Force (IETF) and variations, updates, and revisions thereof, and Network Virtualization using Generic Routing Encapsulation (NVGRE) according to Internet Draft titled "NVGRE: Network Virtualization using Generic Routing Encapsulation" submitted with the IETF and variations, updates and revisions thereof. For example, non-VXLAN devices include devices that are not enabled with either VXLAN or NVGRE; VXLAN enabled devices include devices that are enabled with either VXLAN or NVGRE, or both.

VXLAN enabled devices can include, by way of example, and not as a limitation, a virtual machine (VM) 16. Non-VXLAN devices can include, by way of examples, and not limitations, one or more service nodes 18 (e.g., physical or virtual servers). VM 16 may interface with a Virtual Ethernet Module (VEM) 20. VM 16 may communicate with gateway 14 over one or more network elements in L2 network 22. (L2 indicates Layer 2 of the Open Systems Interconnection (OSI) model of networking). One or more service nodes 18 may communicate with gateway 14 over one or more network elements in L2 network 24. In some embodiments, L2 network 22 may be disparate and distinct from L2 network 24; in other embodiments, L2 network 22 may include, or comprise a portion of L2 network 24. Devices communicating with gateway 14 over L2 network 22 may comprise VXLAN enabled devices; devices communicating with gateway 14 over L2 network 24 may comprise non-VXLAN enabled devices.

According to various embodiments, non-VXLAN devices, such as service nodes 18 may register in network 12 with a central controller 26. As used herein, the term "controller" includes a software or hardware device that can manage flow control to enable intelligent networking in network 12. Central controller 26 can comprise a software defined networking (SDN) controller in some embodiments. For example, controller 26 may be based on SDN protocols, such as OpenFlow, that can enable appropriate packet forwarding in network 12. In some embodiments, controller 26 may interface between network devices (e.g., service nodes 18) and applications (e.g., running on VM 16).

In some embodiments, controller 26 may be associated with (e.g., have access to) an inventory database 28 that can store registration information of non-VXLAN devices. By way of examples and not limitations, registration information can include the Internet Protocol (IP) address and VLAN ID of the registering devices (e.g., registration information corresponding to service node 18 at $IP_1$ and VLAN $V_1$ may comprise $\{IP_1, V_1\}$).

VXLAN enabled devices (e.g., VM 16) that want to communicate with non-VXLAN devices (e.g., service node 18 at $IP_1$) may inform controller 18 through a discovery process. Controller 26 may determine that VM 16 in VXLAN segment $S_1$ wants to communicate with service node 18 at $IP_1$ in VLAN $V_1$. A configuration module 20 in controller 26 may communicate with a Representational State Transfer (REST) Application Programming Interface (API) 32 exposed on gateway 14 to configure gateway 14 with an $S_1$ to $V_1$ mapping in the network path. Alternatively, controller 26 may inform VM 16 via VEM 20 to use VLAN $V_1$ instead of VXLAN segment $S_1$ to send out traffic from VM 16.

For purposes of illustrating the techniques of communication system 10, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Current network architectures can be rigid, complex and costly. Limitations of physical networks tie an increasingly pooled dynamic virtual world back to inflexible, dedicated hardware, creating artificial barriers to utilize network capacity efficiently. For example, while a VM can be provisioned in a matter of minutes, enabling the VM with the necessary network and security services still takes a long time because the current network and security operations remain dependent on manual provisioning of VXLANs, VLANs and dedicated physical appliances with fragmented management interfaces.

VLANs according to IEEE 802.1Q standard have been the traditional mechanism for providing logical network isolation. The IEEE 802.1Q standard specifies a 12-bit VLAN identifier (ID), which limits the scalability of cloud networks beyond 4K VLANs. VXLAN can overcome the scalability limitation of VLANs with a MAC in User Datagram Protocol (MAC-in-UDP) encapsulation technique and a 24-bit segment identifier in the form of a VXLAN Segment ID. VXLAN creates Layer 2 logical networks encapsulated in standard Layer 3 IP packets. A "Segment ID" in every frame differentiates the VXLAN logical networks from each other without any VLAN tags, allowing large numbers of isolated Layer 2 VXLAN networks to co-exist on a common Layer 3 infrastructure.

VXLAN is a method for "floating" virtual domains on top of a common networking and virtualization infrastructure. VXLAN provides the capability to create isolated, multi-tenant broadcast domains across data centers and enables creation of elastic, logical networks that span physical network boundaries. VXLAN leverages existing Ethernet technology enabling large numbers of virtual domains to be created above the Layer 3 network infrastructure, with isolation from each other and the underlying network. VXLAN offers several benefits, for example, flexibility, streamlined network operations, and investment protection. Datacenter server and storage utilization and flexibility can be maximized through support of VXLANs that cross switching and pod boundaries. VXLAN runs on standard Layer 3 IP networks, eliminating the need to build and manage a large Layer 2 underlying transport layer. VXLAN runs over standard switching hardware, with no need for software upgrades or special code versions on the switches.

VXLAN is essentially a tunneling technique, and a gateway is required to translate VXLAN segment IDs to VLAN IDs so that non-VXLAN devices can communicate with VXLAN enabled devices. The gateway connects VXLAN enabled devices on one interface with non-VXLAN devices on another interface. The gateway functionality could be implemented in software or hardware. For incoming frames on the VXLAN connected interface, the gateway strips out the VXLAN header and forwards to a physical port based on the destination MAC address of the inner Ethernet frame. Decapsulated frames with the inner VLAN ID are discarded unless configured explicitly to be passed on to the non-VXLAN interface. In the reverse direction, incoming frames for the non-VXLAN interfaces are mapped to a specific VXLAN overlay network based on the VLAN ID in the frame. Unless configured explicitly to be passed on in the encapsulated VXLAN frame, the VLAN ID is removed before the frame is encapsulated for VXLAN.

Existing mechanisms for configuring the gateway includes manually mapping the VLAN IDs to specific VXLAN segment IDs. For example, manual configuration may be performed in a central management console (e.g., Cisco® Nexus 1000V Virtual Supervisor Module (VSM)) and then downloaded to the gateway. An example manual configuration of VMware gateway includes: opening a graphical user interface (GUI) for configuration, selecting an external interface and configuring its properties; selecting internal interfaces connected to VXLAN networks (or sub-networks), and various other steps. As the size of the network increases, manual configuration can become cumbersome and prone to errors.

Communication system 10 is configured to address these issues (and others) in offering a system and method for connection persistence across server farms in a network environment. Embodiments of communication system 10 can register non-VXLAN devices (e.g., service nodes 18 at $IP_1$ through $IP_N$) with central controller 26. The registering may comprise generating registration information associating the non-VXLAN devices with a VLAN (e.g., $\{IP_1, V_1\}, \ldots \{IP_N, V_M\}$) in network 12. In some embodiments, the registration information is stored in inventory database 28. Controller 26 may receive a communication request (e.g., discovery information) from a VXLAN enabled device (e.g., VM 16) to communicate with a particular non-VXLAN device (e.g., service node 18 at $IP_1$). In a specific embodiment, the communication request may comprise an Address Resolution Protocol (ARP) message.

Configuration module 30 in controller 26 may retrieve the registration information from inventory database 28. Based on the registration information, configuration module 30 may map a VXLAN segment (e.g., $S_1$) corresponding to the VXLAN enabled device VM 16 with the VLAN $V_1$ associated with the non-VXLAN service node 18 at $IP_1$. Controller 26 may configure gateway 14 with the mapping through a suitable API (e.g., REST API 32) exposed at gateway 14.

Embodiments of communication system 10 can decouple VXLAN gateway 14 from underlying hardware and/or other network infrastructure and offer the gateway translation services as a generic programmable service node, for example, available on a SDN platform. A simple and network device-independent method may be provided to specify and apply configuration for gateway 14. An appropriate interface may be provided, for example, by exposing REST APIs, on gateway 14 to facilitate dynamically programming and management by controller 26. Embodiments of communication system 10 can provide ease of configuration and deployment for gateway 14, and reduce or eliminate manual configuration, which may involve human error.

Turning to the infrastructure of communication system 10, the network topology can include any number of servers, service nodes, virtual machines, switches (including distributed virtual switches), routers, and other nodes inter-connected to form a large and complex network. A node may be any electronic device, client, server, peer, service, application, or other object capable of sending, receiving, or forwarding information over communications channels in a network. Elements of FIG. 1 may be coupled to one another through one or more interfaces employing any suitable connection (wired or wireless), which provides a viable pathway for electronic communications.

Additionally, any one or more of these elements may be combined or removed from the architecture based on particular configuration needs. Communication system 10 may include a configuration capable of TCP/IP communications for the electronic transmission or reception of data packets in a network. Communication system 10 may also operate in conjunction with a User Datagram Protocol/Internet Protocol (UDP/IP) or any other suitable protocol, where appropriate and based on particular needs. In addition, gateways, routers, switches, and any other suitable nodes (physical or virtual) may be used to facilitate electronic communication between various nodes in the network.

Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10. It should be understood that communication system 10 shown in FIG. 1 is simplified for ease of illustration. Communication system 10 can include any number of servers, service nodes, virtual machines, gateways (and other network elements) within the broad scope of the embodiments.

The example network environment may be configured over a physical infrastructure that may include one or more networks and, further, may be configured in any form including, but not limited to, LANs, wireless local area networks (WLANs), VLANs, metropolitan area networks (MANs), wide area networks (WANs), virtual private networks (VPNs), Intranet, Extranet, any other appropriate architecture or system, or any combination thereof that facilitates communications in a network. In some embodiments, a communication link may represent any electronic link supporting a LAN environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines (DSL), telephone lines, T1 lines, T3 lines, wireless, satellite, fiber optics, cable, Ethernet, etc. or any combination thereof) and/or through any additional networks such as a wide area networks (e.g., the Internet).

Gateway 14 may be any suitable switch, load-balancer or other network element appliance that translates and forwards traffic between VXLAN enabled devices and non-VXLAN devices. Various load-balancing and other networking algorithms may be executed on gateway 14 to translate and forward traffic within the broad scope of the embodiments. In some embodiments, configuration module 30 can include an application executing in, or with, controller 26. In other embodiments, configuration module 30 can include an application executing on another network element in communication with controller 26 and gateway 14. In some embodiments, configuration module 30 may be implemented in a separate stand-alone box that can be plugged into, or otherwise connected to, controller 26 and gateway 14. In some embodiments, configuration module 30 may be implemented in hardware, in software, or in a combination of hardware and software.

In some embodiments, controller 26 can be configured according to SDN architecture. In the SDN architecture, the control and data planes are decoupled, network intelligence and state are logically centralized in controller 26, and the underlying network infrastructure is abstracted from the applications. An example implementation of controller 26 includes Cisco® ONE controller. Controller 26 may be virtualized and centralized in network 12, enabling it to manage and control substantially all flows in network 12. Proprietary and/or open source software may be executed in network 12 to enable controller 26 to perform its operations.

Figure 2:
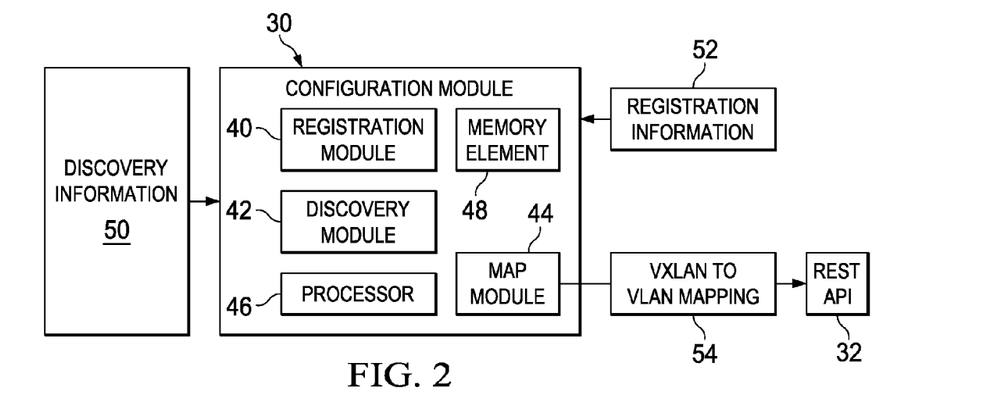
FIG. 2 is a simplified block diagram illustrating example details of the communication system in accordance with one embodiment.

Turning to FIG. 2, FIG. 2 is a simplified block diagram illustrating example details of an embodiment of communication system 10. Configuration module 30 may include a registration module 40, a discovery module 42, a map module 44, a processor 46, and a memory element 48. Discovery information 50, comprising, for example, an ARP message from a VXLAN enabled device (e.g., VM 16) requesting the Media Access Control (MAC) address of a non-VXLAN device (e.g., service node 18 at $IP_1$), may be received by discovery module 42 at configuration module 30. In specific embodiments, discovery information 50 may include the VXLAN segment of the requesting VXLAN enabled device. Discovery module 42 may identify and extract the VXLAN segment information from discovery information 50.

Registration module 40 may store and retrieve registration information 52 from non-VXLAN devices (e.g., including service node 18 at $IP_1$). In some embodiments, registration information 52 may be queried and extracted by registration module 40 from the non-VXLAN devices. In other embodiments, the non-VXLAN devices may send registration information 52 to controller 26 upon boot-up. In yet other embodiments, registration information 52 may be configured in controller 26, for example, for generating port profiles for the non-VXLAN enabled devices that are attached to network 12. Various other mechanisms for generating and/or retrieving registration information 52 may be included within the broad scope of the embodiments.

Map module 44 may map the VXLAN segment identified in discovery information 50 with the VLAN in registration information 52 of the destination non-VXLAN device and generate a VXLAN to VLAN mapping 54. Map module 44 may communicate VXLAN to VLAN mapping 54 with REST API 32, to facilitate configuration of gateway 14.

Figure 3:
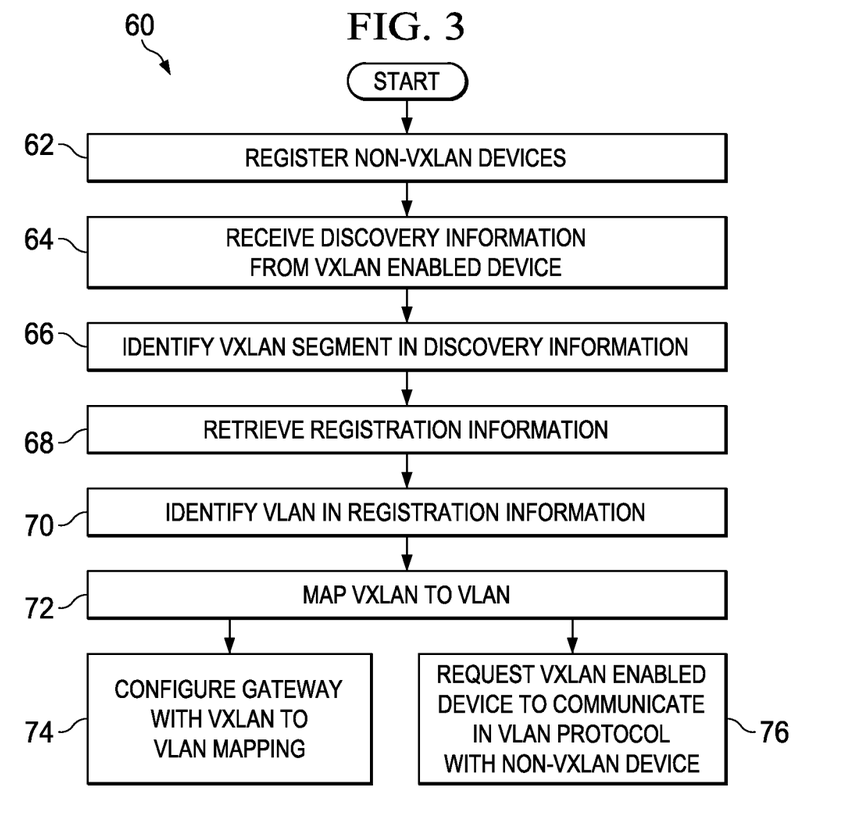
FIG. 3 is a simplified flow diagram illustrating potential example operations that may be associated with an embodiment the communication system.

Turning to FIG. 3, FIG. 3 is a simplified flow diagram illustrating example operations 60 that may be associated with an embodiment of communication system 10. At 62, non-VXLAN devices (e.g., service nodes 18 at $IP_1$ to $IP_N$) may register with controller 26. In some embodiments, controller 26 may initiate the registration; in other embodiments, the non-VXLAN devices may initiate the registration. At 64, controller 26 may receive discovery information 30 from a VXLAN enabled device (e.g., VM 16). At 66, controller 26 may identify a VXLAN segment in discovery information 50.

At 68, controller 26 may retrieve registration information 52 corresponding to the destination non-VXLAN device (e.g., service node 18 at $IP_1$) from inventory database 28. At 70, controller 26 may identify the VLAN in registration information 52. At 72, controller 26 may map the VXLAN segment identified at 66 with VLAN identified at 70 in VXLAN to VLAN mapping 54. At 74, controller 26 may configure gateway 14 with VXLAN to VLAN mapping 54. Alternatively, at 76, controller 26 may request VXLAN enabled device VM 16 to communicate in VLAN protocol (or other suitable non-VXLAN protocol) with the non-VXLAN device (e.g., service node 18 at $IP_1$).

Figure 4:
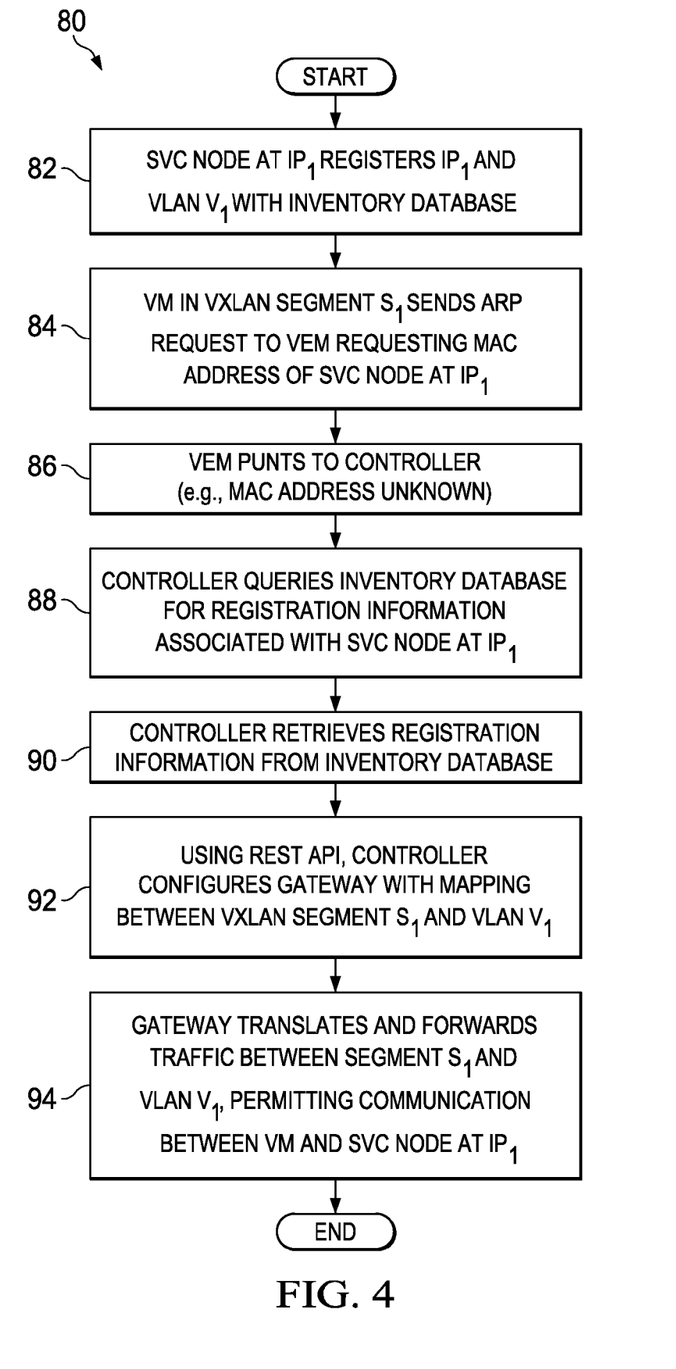
FIG. 4 is a simplified flow diagram illustrating other potential example operations that may be associated with an embodiment the communication system.

Turning to FIG. 4, FIG. 4 is a simplified flow diagram illustrating example operations 80 that may be associated with an embodiment of communication system 10. At 82, service node 18 at $IP_1$ may register network information comprising IP address and VLAN ID (e.g., $\{IP_1, V_1\}$) with inventory database 28. At 84, VM 16 in VXLAN segment $S_1$ may want to talk to (e.g., communicate with) service node 18 at $IP_1$. VM 16 may send out an ARP request to VEM 20 requesting MAC address of service node 18 at $IP_1$. At 86, VEM 20 may punt the ARP request to controller 26, for example, as MAC address may be unknown (e.g., as would be the case for a first time communication between VM 16 and service node 18 at $IP_1$ in a preconfigured time period).

At 88, controller 26 may query inventory database 28 for registration information 52 associated with service node 18 at $IP_1$. At 90, controller 26 may retrieve registration information 52 from inventory database 28. At 92, using REST API 32, controller 26 may configure gateway 14 with VXLAN to VLAN mapping 54, associating VXLAN segment $S_1$ and VLAN $V_1$. At 94, gateway 14 may translate and forward traffic between VXLAN segment $S_1$ and VLAN $V_1$, permitting communication between VM 16 and service node 18 at $IP_1$.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of any executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, configuration module 30. In some embodiments, one or more of these features may be implemented in hardware, provided external to these elements, or consolidated in any appropriate manner to achieve the intended functionality. The various network elements may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, configuration module 30 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory element 68) can store data used for the operations described herein. This includes the memory element being able to store instructions (e.g., software, logic, code, etc.) in non-transitory computer readable media, such that the instructions are executed to carry out the activities described in this Specification. A processor can execute any type of instructions associated with the data to achieve the operations detailed herein in this Specification. In one example, processors (e.g., processor 66) could transform an element or an article (e.g., data) from one state or thing to another state or thing.

In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory computer readable storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
    registering, at a central controller in a network, a non-Virtual eXtensible Local Area Network (VXLAN) device with registration information associating the non-VXLAN device with a virtual local area network (VLAN) in a network environment, wherein the registration information comprises an identifier of the non-VXLAN device and an identifier of the VLAN;
    receiving, at the central controller, a communication request from a VXLAN enabled device to communicate with the non-VXLAN device, wherein the communication request comprises an identifier of a VXLAN segment corresponding to the VXLAN enabled device and the identifier of the non-VXLAN device;
    mapping, at the central controller, based on the registration information, the VXLAN segment corresponding to the VXLAN enabled device with the VLAN associated with the non-VXLAN device; and
    configuring, by the central controller, a gateway with the mapping through a suitable application programming interface (API) at the gateway.

2. The method of claim 1, wherein the gateway translates and forwards traffic between the VXLAN enabled device and the non-VXLAN device.

3. The method of claim 1, wherein the API comprises Representational State Transfer (REST) API.

4. The method of claim 1, wherein the registration information is stored in an inventory database.

5. The method of claim 4, further comprising retrieving the registration information from the inventory database.

6. The method of claim 1, wherein the communication request comprises an Address Resolution Protocol (ARP) message.

7. The method of claim 1, wherein the controller comprises a Software Defined Networking (SDN) controller.

8. The method of claim 7, wherein the VXLAN enabled device comprises a virtual machine (VM), wherein the VM interfaces with a virtual Ethernet Module (VEM), wherein the VEM punts the communication request from the VM to the SDN controller.

9. Non-transitory media encoded in logic that includes instructions for execution that when executed by a processor of a central controller in a network, is operable to perform operations comprising:
    registering, at the central controller, a non-VXLAN device with registration information associating the non-VXLAN device with a VLAN in a network environment, wherein the registration information comprises an identifier of the non-VXLAN device and an identifier of the VLAN;
    receiving, at the central controller, a communication request from a VXLAN enabled device to communicate with the non-VXLAN device, wherein the communication request comprises an identifier of a VXLAN segment corresponding to the VXLAN enabled device and the identifier of the non-VXLAN device;
    mapping, at the central controller, based on the registration information, the VXLAN segment corresponding to the VXLAN enabled device with the VLAN associated with the non-VXLAN device; and
    configuring, by the central controller, a gateway with the mapping through a suitable API at the gateway.

10. The media of claim 9, wherein the registration information is stored in an inventory database.

11. The media of claim 10, further comprising retrieving the registration information from the inventory database.

12. The media of claim 9, wherein the communication request comprises an ARP message.

13. The media of claim 9, wherein the controller comprises a SDN controller.

14. The media of claim 13, wherein the VXLAN enabled device comprises a VM, wherein the VM interfaces with a VEM, wherein the VEM punts the communication request from the VM to the SDN controller.

15. An apparatus, comprising:
    a configuration module;
    a memory element for storing data; and a processor that executes instructions associated with the data, wherein the processor and the memory element cooperate such that the apparatus is configured as a central controller for:

registering, at the apparatus, a non-VXLAN device, with registration information associating the non-VXLAN device with a VLAN in a network environment, wherein the registration information comprises an identifier of the non-VXLAN device and an identifier of the VLAN;

receiving, at the apparatus, a communication request from a VXLAN enabled device to communicate with the non-VXLAN device, wherein the communication request comprises an identifier of a VXLAN segment corresponding to the VXLAN enabled device and the identifier of the non-VXLAN device;

mapping, at the apparatus, based on the registration information, the VXLAN segment corresponding to the VXLAN enabled device with the VLAN associated with the non-VXLAN device; and configuring a gateway with the mapping through a suitable API at the gateway.

16. The apparatus of claim 15, wherein the registration information is stored in an inventory database.

17. The apparatus of claim 16, further comprising retrieving the registration information from the inventory database.

18. The apparatus of claim 15, wherein the communication request comprises an ARP message.

19. The apparatus of claim 15, wherein a SDN controller configures the gateway.

20. The apparatus of claim 19, wherein the VXLAN enabled device comprises a VM, wherein the VM interfaces with a VEM, wherein the VEM punts the communication request from the VM to the SDN controller.

* * * * *